(12) United States Patent
Renaudin et al.

(10) Patent No.: US 9,707,868 B2
(45) Date of Patent: Jul. 18, 2017

(54) CHILD CAR SEAT HAVING ACTIVE PROTECTION MEANS

(71) Applicant: DOREL JUVENILE GROUP, INC., Foxboro, MA (US)

(72) Inventors: Francois Renaudin, Cholet (FR); Nicolas Garnier, Saint Germain sur Meine (FR)

(73) Assignee: Dorel Juvenile Group, Inc., Foxboro, MA (US)

(*) Notice: Subject to any disclaimer, the term of this patent is extended or adjusted under 35 U.S.C. 154(b) by 0 days.

(21) Appl. No.: 14/437,781

(22) PCT Filed: Oct. 25, 2013

(86) PCT No.: PCT/EP2013/072421
§ 371 (c)(1),
(2) Date: Apr. 22, 2015

(87) PCT Pub. No.: WO2014/064262
PCT Pub. Date: May 1, 2014

(65) Prior Publication Data
US 2015/0291065 A1    Oct. 15, 2015
US 2017/0158095 A9    Jun. 8, 2017

Related U.S. Application Data

(63) Continuation-in-part of application No. 13/995,651, filed as application No. PCT/EP2011/073450 on Dec. 20, 2011, now Pat. No. 8,851,514.

(30) Foreign Application Priority Data

Dec. 20, 2010  (FR) .................................... 10 60856
Feb. 24, 2011  (FR) .................................... 11 51522
Oct. 26, 2012  (FR) .................................... 12 60272

(51) Int. Cl.
B60N 2/28    (2006.01)
B60N 2/42    (2006.01)
(Continued)

(52) U.S. Cl.
CPC ........... *B60N 2/2884* (2013.01); *B60N 2/002* (2013.01); *B60N 2/0276* (2013.01); *B60N 2/265* (2013.01);
(Continued)

(58) Field of Classification Search
CPC .. B60N 2/2884; B60N 2/265; B60N 2/42781; B60N 2/002; B60N 2/0276; B60N 2/2812; B60N 2/2887
(Continued)

(56) References Cited

U.S. PATENT DOCUMENTS 4,834,420 A * 5/1989 Sankrithi ............. A01K 1/0272
                                                280/728.1
5,232,243 A * 8/1993 Blackburn ............. B60N 2/002
                                                177/144
(Continued)

FOREIGN PATENT DOCUMENTS

FR    2720352 A1    12/1995
FR    2941181 A1     7/2010

OTHER PUBLICATIONS

PCT Search Report completed on Nov. 18, 2013 and issued in connection with PCT/EP2013/072421.
(Continued)

*Primary Examiner* — Karen Beck
(74) *Attorney, Agent, or Firm* — Barnes & Thornburg LLP

(57) ABSTRACT

The present disclosure concerns a child car seat comprising an active protection system and a system for triggering the active protection system when needed.

25 Claims, 2 Drawing Sheets

Figure 1:
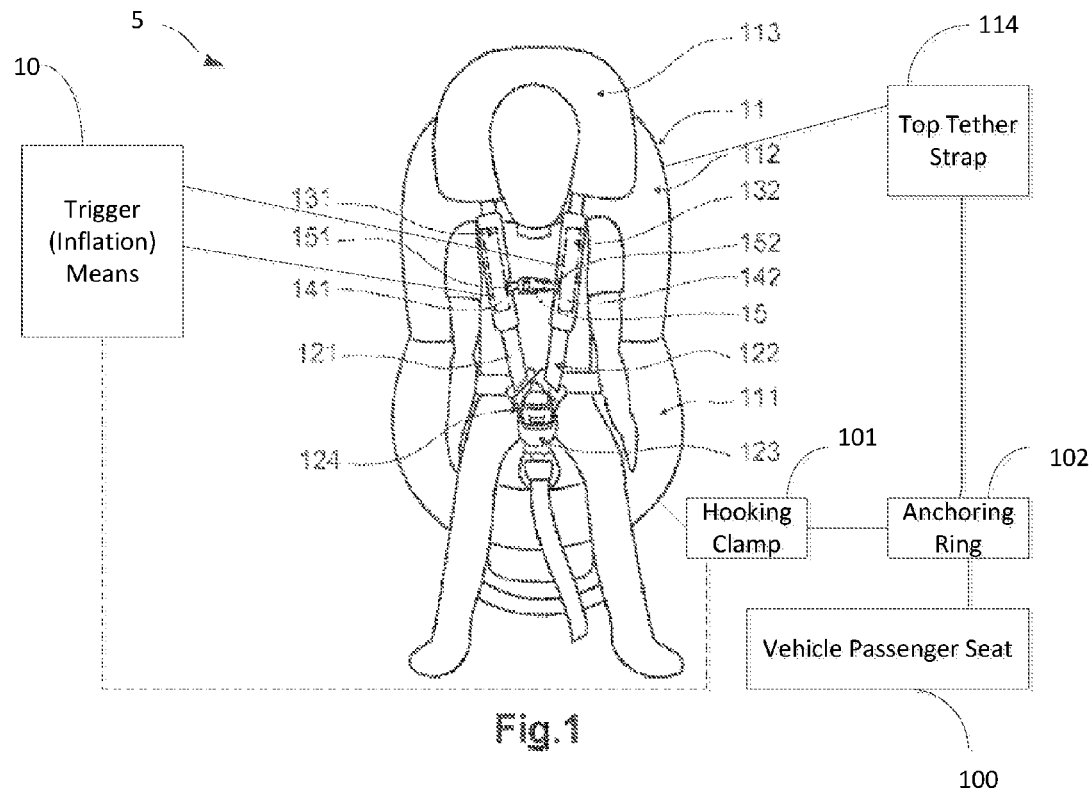

(51) Int. Cl.
*B60N 2/00* (2006.01)
*B60N 2/02* (2006.01)
*B60N 2/427* (2006.01)
*B60N 2/26* (2006.01)

(52) U.S. Cl.
CPC ......... *B60N 2/2812* (2013.01); *B60N 2/2887* (2013.01); *B60N 2/42781* (2013.01)

(58) Field of Classification Search
USPC ........................................................ 280/733
See application file for complete search history.

(56) References Cited

U.S. PATENT DOCUMENTS

| | | | | |
|---|---|---|---|---|
| 5,413,377 | A * | 5/1995 | Kamiyama | A44B 11/2503 280/733 |
| 5,653,501 | A * | 8/1997 | Goor | B60N 2/2839 297/216.11 |
| 5,770,997 | A * | 6/1998 | Kleinberg | B60N 2/002 280/235 |
| 6,739,661 | B1 * | 5/2004 | Dukes | B60N 2/0232 297/256.1 |
| 7,232,182 | B2 * | 6/2007 | Yoshida | B60N 2/2806 297/216.11 |
| 8,474,858 | B2 * | 7/2013 | Urabe | B60R 21/207 280/728.2 |
| 8,690,188 | B2 * | 4/2014 | Fiore | B60N 2/2812 280/733 |
| 8,851,514 | B2 * | 10/2014 | Renaudin | B60N 2/2812 280/733 |
| 8,950,809 | B2 * | 2/2015 | Szakelyhidi | B60N 2/2806 297/217.3 |
| 9,126,557 | B2 * | 9/2015 | Renaudin | B60R 21/16 |
| 2005/0121956 | A1 * | 6/2005 | Dolan | B60N 2/2887 297/253 |
| 2007/0228787 | A1 * | 10/2007 | Nakhla | B60N 2/2812 297/250.1 |
| 2008/0191854 | A1 * | 8/2008 | LittleJohn | B60R 21/0134 340/441 |
| 2008/0303325 | A1 * | 12/2008 | Scholz | B60N 2/2806 297/250.1 |
| 2009/0261979 | A1 * | 10/2009 | Breed | B60J 10/00 340/576 |
| 2010/0253498 | A1 * | 10/2010 | Rork | B60N 2/002 340/457.1 |
| 2010/0264706 | A1 * | 10/2010 | Vogt | B60N 2/2812 297/250.1 |
| 2013/0001938 | A1 * | 1/2013 | Schondorf | B60N 2/2812 280/741 |
| 2014/0008959 | A1 * | 1/2014 | Renaudin | B60N 2/2812 297/471 |
| 2015/0054263 | A1 * | 2/2015 | Renaudin | B60R 21/16 280/728.2 |
| 2015/0076879 | A1 * | 3/2015 | Line | A47C 7/22 297/284.2 |
| 2015/0091348 | A1 * | 4/2015 | Juchniewicz | B60N 2/2887 297/256.16 |
| 2015/0129343 | A1 * | 5/2015 | Teng | B60N 2/002 180/271 |
| 2015/0130149 | A1 * | 5/2015 | Sims | B60N 2/286 280/47.38 |
| 2015/0291065 | A1 * | 10/2015 | Renaudin | B60N 2/002 297/216.11 |
| 2016/0144752 | A1 * | 5/2016 | Frank | B60N 2/2803 297/216.11 |

OTHER PUBLICATIONS

Search and Opinion dated Oct. 2, 2013 and issued in connection with FR1260272.

* cited by examiner

CHILD CAR SEAT HAVING ACTIVE PROTECTION MEANS

CROSS REFERENCE TO RELATED APPLICATIONS

This application is a U.S. nationalization under 35 U.S.C. §371 of International Application No. PCT/EP2013/072421, filed Oct. 25, 2013, which claims priority to French Application No. 1260272, filed Oct. 26, 2012. This application is also a continuation-in-part of U.S. Pat. No. 8,851,514, which is a nationalization of International Application No. PCT/EP2011/073450 filed Dec. 20, 2011, which claims priority to Foreign Applications, FR 1151522 filed Feb. 24, 2011 and FR 1060856 filed Dec. 20, 2010.

FIELD OF THE INVENTION

The field of the invention is that of child care, and more precisely of seats intended to be installed in a vehicle, hereinafter called child car seat.

Even more precisely, the invention relates to car seats provided with active protection, or safety, means, and for example airbags, implemented, or activated, in an accident situation.

PRIOR ART

Child car seats are designed to provide optimum protection of the child in the event of an accident, insofar as possible regardless of the impact that the vehicle is subjected to.

This protection is generally provided, at least in part, by so-called passive absorption elements (more precisely "passive during the accident"). In particular, these absorption elements can be elements made from materials of the expanded polystyrene type (PSE), which can absorb all or a portion of the impact. These absorption elements are generally in direct or quasi-direct contact with a portion of the body of the child (for example the back, the shoulders, the head, etc.).

As a supplement, an active protection (more precisely "active during the accident") can be implemented. In particular, these active protection means can be one or several airbags, as described for example in patent document FR2969055, in the name of the Holder of this patent application.

Many documents describe such air bags adapted for child car seats. However, to date, there are no such seats on the market.

This is probably due, at least in part, to the difficulty in implementing such active means. Indeed, these active means require detection of collision, or of deceleration, in order to trigger the systems quickly enough to make it possible to protect the child.

Such means for triggering are, generally, known, in motor vehicles, to act on safety systems adapted to adults installed in the vehicle (airbags, safety belts with pyrotechnic pretensioners, etc.). The vehicle is provided with many sensors, and powerful processing means, able to effectively decide if the active means of safety have to be triggered.

These means proper to the vehicle may however not be adapted directly to a child car seat. Indeed, a child car seat is intended, by nature, to be installed in different types of vehicles. Conversely, a vehicle can receive different types of child car seats. In the absence of a particular standard, it is therefore not possible to make use of the data read and processed by the vehicle.

Consequently, the system for detecting a collision, impact or deceleration, intended to trigger the active protection means of a child car seat must be autonomous and proper to the latter.

The documents that describe active safety systems, and in particular airbags, for car seat generally provide for the presence of means for detecting impacts, that control the triggering of airbags, but which do not provide any precision as to the operation of these means, and in particular as to the manner in which the measurements are taken and used. This is however a crucial problem. Indeed, it is essential that the active means be triggered systematically when this is required, and quickly enough in order to ensure the protection of the child.

However, conversely, it is also important that untimely triggerings be prevented, insofar as possible, for safety reasons (an untimely triggering can injure the child) as well as for obvious reasons concerning cost (active systems are generally single-use systems, and they require a replacement of the seat, or at least of the active protection means, following a triggering).

Other difficulties linked to the fact that the car seat has to operate autonomously must be taken into account, such as the electrical power supply of the means for detecting and actuating.

PRESENTATION OF THE INVENTION

For this, the invention proposes a child car seat, comprising active protection means and means for triggering said active protection means, in case of need. According to the invention, said means for triggering, advantageously carried by the car seat, deliver a command to trigger said active protection means according to a combination of at least two signals:

at least one first signal delivered by at least one locking sensor of the car seat to the vehicle, said sensor being in particular carried by the car seat, and at least one second signal delivered by detection means, indicating the detection of an accident situation.

As such, according to this aspect of the invention, unnecessary triggerings of the active protection means are prevented, when the car seat is not transporting a child and/or when it is not correctly installed in a vehicle.

According to embodiments of the invention, said means for triggering take into account at least one other first signal delivered by one of the means belonging to the group comprising:

sensors of the locking of the retaining straps for retaining a child in said car seat;

the sensors of the presence of a child in said car seat.

According to a particular embodiment, said detection means comprise electronic means, that implement at least one accelerometer.

Advantageously, in this case, said detection means take an adjustable triggering threshold into account. This triggering threshold can thus be adjusted in particular according to at least one of the parameters belonging to the group comprising:

the weight of the child;
the height of the child;
the deceleration of the vehicle;
the speed of the vehicle;
the direction of the impact.

Said detection means can also comprise mechanical means, implementing at least one mobile inertia block subjected to a force of inertia.

These mechanical means thus form an inertial sensor, able to operate constantly and without consuming electrical power.

According to a particular embodiment, said detection means include mechanical means and electronic means, said mechanical means activating the electrical power supply of said electronic means, when a force of inertia greater than a first acceleration threshold, called the waking threshold, is detected, and said electronic means delivering said second signal, when they detect an acceleration force that is greater than a second threshold, greater than said first threshold and corresponding to an accident situation.

This is as such a particularly effective unit, since the electrical consumption is substantially reduced (with the electronic means being powered only when they are "awoken" by the mechanical means), and all "at risk" situations or "potential accident" situations are detected, thanks to the waking threshold. The latter can be low, since it does not directly control the triggering of the protection means. The implementation of the electronic means, as a supplement, validate the "actual accident" situation, requiring the triggering of the protection means, or decide that it is a "false alert", according to a fine analysis of the measurements delivered by the accelerometer or accelerometers, and where applicable of various parameters making it possible to adapt the second threshold, or triggering threshold.

According to at least one embodiment, the or at least one of said second signals is delivered by said vehicle, according to measuring signals delivered by sensors carried by the latter.

According to another aspect of the invention, it is provided that at least one portion of said detection means are placed in, on or in the vicinity of a hooking clamp of said seat, intended to cooperate with an anchoring ring integral with said vehicle.

This can be important in order to obtain detection and triggering that are sufficiently rapid.

According to another aspect of the invention, the car seat comprises means that indicate that said active protection means have been triggered and/or that prevent the use of said car seat if said active protection means have been triggered.

It is indeed desirable that a car seat that has undergone a triggering of the active protection means can be detected, and even rendered unusable. Indeed, most of the active protection means are of single-use, and the car seat must then no longer be used, or at the very least be inspected and/or repaired.

According to at least one embodiment, said active protection means comprise at least one airbag.

For example, the car seat can comprise two airbags, housed on or in the shoulder straps of a harness or on or in sheaths mounted on said shoulder straps, and which can be made integral by connection means.

In this case in particular, said connection means carry a locking sensor, delivering the or at least one of said first signals.

According to various embodiments of the invention, said active protection means comprise at least one of the means belonging to the group comprising:

means for blocking or increasing the tension of a "top tether" strap, or anti-tipping strap, intended to fasten an upper portion of said seat and an anchoring point in said vehicle;

means for blocking or increasing the tension of the harness straps of said car seat, intended to maintain a child in said seat;

means for blocking or increasing the tension of a connection strap between a base and a mobile armchair in rotation with respect to said base;

means for uprighting the seatback of said car seat;

means for deploying an anti-submarining device; means for compressing the child seat on an armchair or a rear seat of the vehicle, on the lower Isofix® anchorings;

means for modifying the inclination of the seat by the intermediary of a support leg.

LIST OF FIGURES

Figure 2:
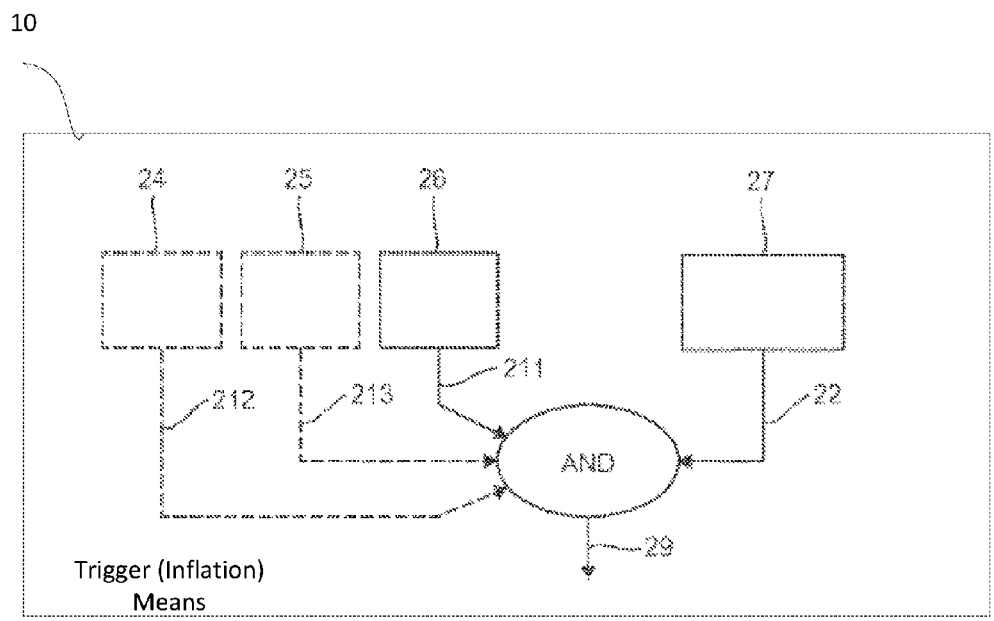
Figure 3:
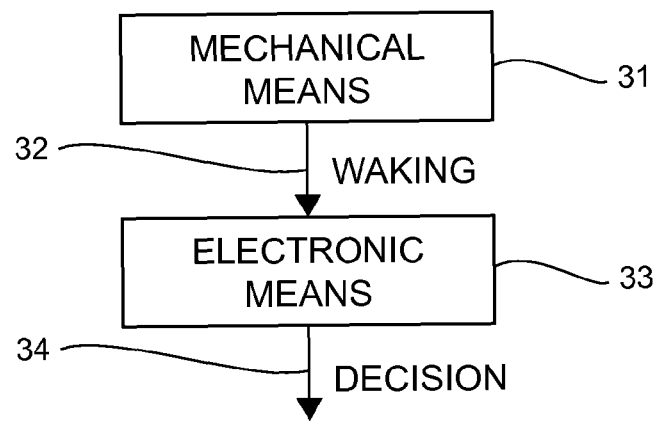
Figure 4:
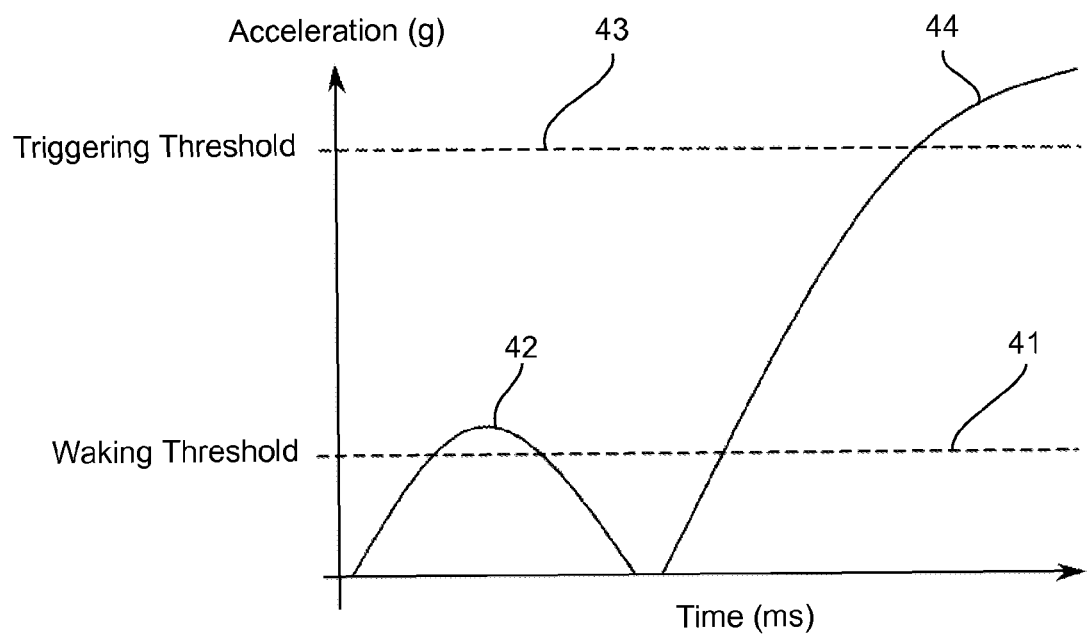

Other characteristics and advantages of the invention shall appear when reading the following description of particular embodiments, provided solely as a simple illustrative and non-limiting example, and the annexed drawings wherein:

FIG. 1 shows an example of a car seat provided with airbags;

FIG. 2 diagrammatically shows the means for triggering the active protection means according to the invention;

FIG. 3 diagrammatically shows a particular embodiment, that combines mechanical means and electronic means;

FIG. 4 shows the operating mode of the means of FIG. 3.

DESCRIPTION OF PARTICULAR EMBODIMENTS

The invention therefore relates to child car seats, provided with active protection means, consequently with means for triggering these active protection means in case of need (impact, accident, deceleration greater than a predetermined threshold, etc.). In the embodiment shown, these active protection means comprise two airbags 141, 142 that can be made integral, such as shown in FIG. 1, and described in detail by the aforementioned patent document FR2969055. Trigger means 10 is provided to inflate airbags 141, 142 as suggested in FIGS. 1 and 2.

More specifically, as illustrated in FIG. 1, the airbags consist of two inflatable elements 141, 142, each respectively mounted on one of the straps of the child's harness and, more specifically, in the embodiment described, in the sleeves fitted on the straps.

According to the invention, these two elements are further attached together, by attachment means provided for this purpose, at or in the vicinity of the straps. These attachment means are mounted on the inflatable elements, so that they remain attached, and held against each other when deployed.

As seen in FIG. 1, the child car seat 11 comprises a seat section 111 and a back section 112, having in this case a headrest 113, which may be movable in respect of height, with respect to the back section 112.

The child is held in this seat 11 using a harness 12, comprising two straps 121 and 122, each to be positioned on one of the child's shoulders, and extending substantially vertically on the child's chest, and a crotch guard 123.

When the harness is positioned, the two straps 121 and 122 and the crotch guard 123 are attached by a locking buckle 124. Each strap 121 and 122 has a sleeve 131, 132, taking position on the child's shoulders and/or upper body, to improve the child's comfort and safety.

These sleeves are generally adjustable in respect of the height thereof, by sliding along the corresponding strap, so as to be suitably positioned at the child's shoulder and chest, according to the child's size.

In the embodiment described, each of these sleeves 131 and 132 contains an inflatable safety element 141, 142. The inflatable safety elements are folded and housed in the sleeves, so as to be deployed effectively, in the event of an impact.

In further embodiments, the inflatable safety elements may be incorporated directly into each strap.

This car seat comprises a harness 12 that has two shoulder straps 121, 122 intended to extend from the shoulders along the chest of a child, and each one carrying an inflatable safety element 141, 142, housed, in this embodiment, in a sheath 131, 132 mounted respectively on the shoulder straps 121, 122, and able to be inflated in the event of an impact that greater than a predetermined threshold.

These inflatable safety elements 141 and 142 are moreover connected by attaching means 15 (e.g. chest clip 15), attaching them together, when the child is installed in the seat.

These attaching elements 15 comprise, in the embodiment shown, two flexible portions, or leather straps, 151 and 152, each provided with a respectively male and female loop element, which can be inserted into one another in order to attach the two leather straps 151 and 152, and able to be separated from one another, via a suitable manual action (chosen in such a way that the child installed cannot himself disconnect these attaching means).

According to this embodiment, the attaching means 15 also provide for the maintaining in a position that is sufficiently close of the two shoulder straps 121 and 122, when a child is installed in the seat ("chest clip" function). This makes it possible to guarantee that the shoulder straps are properly positioned, and to prevent the child from passing an arm under one of the shoulder straps and/or removing one of the shoulder straps while the harness is secured.

These safety elements, or airbags, must be inflated quickly, in the event of an accident, in order to ensure the protection of the child. It is however important to prevent an untimely triggering of the airbags from being triggered, in particular when the seat is not installed correctly in the vehicle on a vehicle passenger seat 100 and/or no child is present in the car seat.

For this purpose, according to a first aspect of the invention, shown in FIG. 2, the means for triggering, which are advantageously entirely carried by the car seat, take at least two separate pieces of information into account:
 at least one first signal 211, 212 and/or 213, indicating a real and/or correct use of the seat in the vehicle; and
 at least one second signal 22, delivered by detection means, indicating the detection of an accident situation.

The first series of signals has for purpose to prevent a triggering of the active protection means, even in the presence of an impact or of an accident, if it is not required, or dangerous.

As such, it is desirable to prevent triggerings when the car seat is not installed on a vehicle seat 100 in a vehicle (for example during its transport or storage). It is also not desirable that the active protection means be triggered if the car seat is not installed correctly, and for example maintained by these Isofix® connectors. As such, a first sensor 24 of the correct locking, or of the correct installation of the seat in the vehicle (for example a sensor associated with the Isofix® connectors) is provided, in order to deliver a piece of information 211 on the correct hooking of the latter using hooking clamp 101 to the anchoring rings 122 provided for this purpose in the vehicle. It is as such to be noted that the equipment producing the first signal comprises according to the invention at least one locking sensor of the car seat to the vehicle, with this sensor preferably being carried by the car seat.

It is moreover desirable that the active protection means are not triggered, even if the car seat is correctly installed in the vehicle, if the latter is not transporting a child.

According to a first approach, this detection can be provided by means for controlling 25 the locking of the harness of the child in the car seat, and for example of the correct securing of the chest clip 15, connecting the two shoulder straps of the harness. This approach is in particular interesting in the case of the seat of FIG. 1, since this clip 15 must also be locked in order to ensure a correct deployment of the airbags.

Other presence sensors of the child 26 can be provided, as an alternative or as a supplement, for example using a weight sensor integrated into the seat portion of the car seat.

It is then suitable to effectively detect an accident situation. This is provided by the detection 27 of one or several predetermined deceleration thresholds, delivering first detection signals 22. According to a first approach, these detection means can be purely mechanical. This approach has the advantage of not requiring electrical power, which makes it possible to simplify the making of the car seat, and to prevent the risks due to the necessity of autonomous operation (which supposes the implementation of autonomous batteries, and the control of the sufficient charge of the latter, in order to generate an alert in the opposite case).

Such a mechanical system can in particular implement a preloaded spring, associated with a mobile inertia block, forming an inertial sensor. When the inertia block is displaced beyond a chosen threshold, the tension of the spring also exceeds a corresponding threshold, and a detection signal 22 is generated.

Various embodiments of such a mechanical system are described in the joint patent application, in the name of the same holder as this application, and having for title "Device for locking a strap in a child car seat and child car seat comprising such a locking device". Other embodiments that make it possible to obtain a similar result can of course be used.

A disadvantage with this approach is that it does not allow for selective adjustment: a single preloading of the spring is possible. For safety reasons, the predetermined threshold is therefore limited, which increases the risk of an untimely triggering.

According to the second approach, it is possible to use electronic means of detection, implementing one or several accelerometers. This approach makes it possible to carry out a more precise detection, and consequently to have a programmable triggering threshold, according to various parameters. Consequently, the risk of an untimely triggering can as such be reduced.

On the other hand, this system must constantly be on standby, which supposes a supply of electrical power that is sufficient for the seat to be used for several months day/year.

According to a third embodiment, shown by FIG. 3, it is provided to combine the two approaches described hereinabove, by providing the mechanical means 31 with a waking function 32, or activating function, of the electronic means 33 in the event of a potential accident situation. As soon as they are activated, the electronic means perform a more in-depth, and more precise, analysis of the situation, in order to decide if the potential accident situation is or is not a real accident situation, requiring the triggering 34 of the active protection means.

In other words, as shown in FIG. 4, the mechanical means react to a relatively low waking threshold 41, encompassing a number of situations that do not require the triggering of the active protection means. As soon as the waking threshold is crossed (42) the mechanical means wake the electronic means 43, which analyse the situation, and decide on the triggering, if the acceleration exceeds (44) a triggering threshold.

This triggering threshold can, where applicable, be adjusted, or variable, according to various parameters, such as the weight of the child (determined using a sensor placed in the seat portion, which can also be used as a presence sensor);

The height of the child (for example determined according to the headrest with respect to the seatback);
The deceleration of the vehicle;
The speed of the vehicle;
The direction of the impact.

In order to ensure the safety of the child, the detection must be carried out very quickly and the command for triggering must be issued more preferably between 10 and 20 milliseconds after the impact. The tests carried out show that the combination of mechanical and electronic means makes it possible to achieve this result.

In order to obtain a fast and precise detection of the deceleration corresponding to an impact, the detection means are preferably placed as close as possible to the anchoring points (e.g. anchoring ring 101) of the vehicle (Isofix® rings), as it is these elements that first receive the deceleration due to the collision. As such, the detection means of the inflation means 10 can be placed in the base 116, in the vicinity of the Isofix® connectors, and even entirely or partially directly on or in these Isofix® connectors as suggested in FIG. 1. Child car seat 11 includes a hooking clamp 102 for engaging and anchoring ring 101 to retain seat 11 in a stationary position on vehicle passenger seat 100 as suggested diagrammatically in FIG. 1.

Although the embodiment described in relation with FIG. 1 has the triggering of airbags, the approach of the invention can of course be implemented, as a supplement or as an alternative, in order to provide for the triggering of other types of active protection means, such as:

means for blocking or increasing the tension of a "top tether" strap, or anti-tipping strap, intended to fasten the upper portion of said seat and an anchoring point in said vehicle;
means for blocking or increasing the tension of the harness straps of said car seat, intended to maintain a child in the seat;
means for blocking or increasing the tension of a connection strap between a base and a mobile armchair in rotation with respect to the base;
means for uprighting the seatback of the car seat;
means for deploying an anti-submarining device;
means for compressing the child seat on a rear seat of the vehicle on the lower Isofix® anchorings;
means for modifying the inclination of the seat by the intermediary of a support leg.

According to another aspect of the invention, the car seat comprises indicator means, specifying if the active protection means have been triggered and/or preventing the use of said car seat if said active protection means have been triggered.

This makes it possible to detect, and/or to render unusable, a car seat that has been subjected to a triggering of the active protection means. Indeed, most active protection means are single-use, and the car seat must then no longer be used, or at the very least be inspected and/or repaired.

A child care device 5 includes a child holder 13 including child car seat 11 adapted to set on a passenger seat in a vehicle 100 and a child-restraint harness 12 associated with the child car seat 11, as suggested in FIGS. 1 and 2. Child-restraint harness 12 is formed to include a first shoulder strap 121 and a second shoulder strap 122 arranged to lie alongside and in spaced-apart relation to the first shoulder strap to provide a neck-receiving space 120 therebetween through which the neck of a child extends when the child-restraint harness 12 is worn by a child seated on the child car seat 11 as suggested in FIG. 1. The device 5 includes an inflatable head-cushion system 141, 142 coupled to the child-restraint harness 12 and configured to include a first inflatable element 141 linked to the first shoulder strap 121 and a second inflatable element 142 linked to the second shoulder strap 122 as suggested in FIG. 1. Each of the first and second inflatable elements 141, 142 are activated to change from a compact storage shape to a relatively larger expanded use shape so as to cause each of the first and second inflatable elements 141, 142 to deploy and cushion the head of a child seated on the child car seat 11 and restrained by the child-restraint harness 12. Inflation means 10 is provided for activating the first and second inflatable elements 141, 142 to assume the relatively larger expanded use shapes in response to generation of both of a first signal 211, 212, 213 associated with establishment of a predetermined car seat condition of one of the child car seat 11 and the child-restraint harness 121, 122, 15 and a second signal 22 associated with detection of exposure of the child car seat to an external force in excess of a predetermined level so that each of the first and second inflatable elements 141, 142 change shape to assume the relatively larger expanded use shape after the predetermined car seat condition is established and after exposure of the child car seat 11 to an external force in excess of the predetermined level is detected.

The inflation means 10 includes detection means 27 for detecting application of an external force to the child car seat 11 and generating the second signal 22 when the external force is in excess of a predetermined level. The detection means 27 is coupled to the child car seat 11 to move therewith relative to the vehicle passenger seat 100. The detection means 27 includes mechanical means for implementing at least one mobile inertia block subjected to a force of inertia. The detection means 27 comprises a preloaded spring and an inertial block coupled to the preloaded spring to form an inertial sensor and displacement of the inertial block beyond a chosen threshold causes generation of the second signal.

As suggested in FIGS. 3 and 4, the detection means 27 includes electronic means 33 for electronically generating the second signal 34 in response to detection of a change in acceleration 44 of the child car seat 11 in excess of a relatively high triggering threshold 43 and mechanical means 31 for activating the electronic means 34 to generate the second signal 34 upon exposure to a change in acceleration of the child car seat 11 in excess of a relatively low waking threshold 41 as compared to the relatively high triggering threshold 43.

The child care device 5 further includes a hooking clamp 102 coupled to the child car seat 11 and configured to mate with an anchoring ring 101 separated from the child car seat 11 and adapted to be mounted in a stationary position relative to the vehicle passenger seat 100 and the detection means 27 is coupled to the hooking clamp 102.

The inflation means 10 further includes placement-sensor means 24 for determining that the child car seat 11 is retained in a predetermined location on the vehicle passenger seat 100 to establish the predetermined car seat condition and generating the first signal 212 when the child car seat 11 is retained in the predetermined location.

The inflation means 10 further includes seat-lock sensor means 24 for determining that the child car seat 11 is retained in a stationary locked position on the vehicle passenger seat 11 to establish the predetermined car seat condition and generating the first signal when the child car seat 11 is retained in the stationary locked position.

The child-restraint harness 12 further includes a chest clip 15 comprising a first part 151 coupled to the first shoulder strap 121 and a second part 152 coupled to the second shoulder strap 122 and configured to mate with the first part 151 to maintain relative position of the first shoulder strap 121 relative to the second shoulder strap 122 when the child-restraint harness 12 is worn by a child seated on the child car seat 11 and the inflation means 10 further includes strap-locking means 25 for determining that the first part 151 of the chest clip 15 is mated to the second part 152 of the chest clip 15 to establish the predetermined car seat condition and generating the first signal 213 when the first and second parts 151, 152 are mated.

The inflation means 10 further includes child-presence sensor means 26 for sensing an external weight force applied to a seat portion 111 of the child car seat 11 to determine that a child is seated on the child car seat 11 to establish the predetermined car seat condition and generating the first signal 211 when the external weight force exceeds a predetermined level.

The invention claimed is:

1. A child care device comprising a child car seat, active protection means and means for triggering said active protection means to deploy the active protection means, in case of need,
characterised in that said triggering means deliver a command for triggering said active protection means according to a combination of at least two signals:
at least one first signal delivered by a piece of equipment of said child car seat, indicating a use of said child car seat in a vehicle and that deployment of the active protection means is permitted, and
at least one second signal delivered by detection means, indicating the detection of an accident situation.

2. The child care device according to claim 1, characterised in that the or at least one of said first signals is delivered by one of the means belonging to the group comprising:
the sensors of the locking of said car seat to said vehicle;
the sensors of the locking of the straps for retaining a child in said car seat;
the sensors of the presence of a child in said car seat.

3. The child care device according to claim 1, characterised in that said detection means include electronic means, implementing at least one accelerometer.

4. The child care device according to claim 3, characterised in that said detection means take an adjustable triggering threshold into account.

5. The child care device according to claim 4, characterised in that said triggering threshold can be adjusted according to at least one of the parameters belonging to the group comprising:
the weight of the child;
the height of the child;
the deceleration of the vehicle;
the speed of the vehicle;
the direction of the impact.

6. The child care device according to claim 1, characterised in that said detection means comprise mechanical means, implementing at least one mobile inertia block subjected to a force of inertia.

7. The child care device according to claim 6, characterised in that said detection means include mechanical means and electronic means implementing at least one accelerometer, said mechanical means activating the electrical power supply of said electronic means, when a force of inertia greater than a first acceleration threshold, called the waking threshold, is detected, and said electronic means delivering said second signal, when they detect an acceleration force that is greater than a second threshold, greater than said first threshold and corresponding to an accident situation.

8. The child care device according to claim 1, characterised in that the or at least one of said second signals is delivered by said vehicle, according to the measurement signals delivered by sensors embedded in the latter.

9. The child care device according to claim 1, characterised in that at least one portion of said detection means are placed in, on or in the vicinity of a hooking clamp of said seat, intended to cooperate with an anchoring ring integral with said vehicle.

10. The child care device according to claim 1, characterised in that it comprises means that indicate that said active protection means have been triggered and/or that prevent the use of said car seat if said active protection means have been triggered.

11. The child care device according to claim 1, characterised in that said active protection means comprise at least one airbag.

12. The child care device according to claim 11, characterised in that it comprises two airbags, housed on or in the shoulder straps of a harness or on or in sheaths mounted on said shoulder straps, and which can be made integral by connecting means.

13. The child care device according to claim 12, characterised in that said connecting means carry a locking sensor, delivering the or at least one of said first signals.

14. The child care device according to claim 1, characterised in that said active protection means include at least one of the means belonging to the group comprising:
means for blocking or increasing the tension of a "top tether" strap, or anti-tipping strap, intended to fasten an upper portion of said seat and an anchoring point in said vehicle;
means for blocking or increasing the tension of the harness straps of said car seat, intended to maintain a child in said seat;
means for uprighting the seatback of said car seat;
means for deploying an anti-submarining device;
means for compressing the child seat on an armchair or a seat of the vehicle, on lower Isofix® anchorings;
means for modifying the inclination of the seat by the intermediary of a support leg.

15. A child care device comprising
a child holder including child car seat adapted to set on a passenger seat in a vehicle and a child-restraint harness associated with the child car seat and formed to include a first shoulder strap and a second shoulder strap arranged to lie alongside and in spaced-apart relation to the first shoulder strap to provide a neck-receiving space therebetween through which the neck of a child extends when the child-restraint harness is worn by a child seated on the child car seat, an inflatable head-cushion system coupled to the child-restraint harness and configured to include a first inflatable element linked to the first shoulder strap and a second inflatable element linked to the second shoulder strap, each of the first and second inflatable elements being activated to change from a compact storage shape to a relatively larger expanded use shape so as to cause each of the first and second inflatable elements to deploy and cushion the head of a child seated on the child car seat and restrained by the child-restraint harness, and inflation means for activating the first and second inflatable elements to assume the relatively larger expanded use shapes in response to generation of both of a first signal associated with establishment of a predetermined car seat condition of one of the child car seat and the child-restraint harness and a second signal associated with detection of exposure of the child car seat to an external force in excess of a predetermined level so that each of the first and second inflatable elements change shape to assume the relatively larger expanded use shape after the predetermined car seat condition is established and after exposure of the child car seat to an external force in excess of the predetermined level is detected.

16. The child care device of claim 15, wherein the inflation means includes detection means for detecting application of an external force to the child car seat and generating the second signal when the external force is in excess of a predetermined level.

17. The child care device of claim 16, wherein the detection means is coupled to the child car seat to move therewith relative to the vehicle passenger seat.

18. The child care device of claim 17, wherein the detection means comprises mechanical means for implementing at least one mobile inertia block subjected to a force of inertia.

19. The child care device of claim 17, wherein the detection means comprises a preloaded spring and an inertial block coupled to the preloaded spring to form an inertial sensor and displacement of the inertial block beyond a chosen threshold causes generation of the second signal.

20. The child care device of claim 16, wherein the detection means includes electronic means for electronically generating the second signal in response to detection of a change in acceleration of the child car seat in excess of a relatively high triggering threshold and mechanical means for activating the electronic means to generate the second signal upon exposure to a change in acceleration of the child car seat in excess of a relatively low waking threshold as compared to the relatively high triggering threshold.

21. The child care device of claim 16, further comprising a hooking clamp coupled to the child car seat and configured to mate with an anchoring ring separated from the child car seat and adapted to be mounted in a stationary position relative to the vehicle passenger seat and the detection means is coupled to the hooking clamp.

22. The child care device of claim 16, wherein the inflation means further includes placement-sensor means for determining that the child car seat is retained in a predetermined location on the vehicle passenger seat to establish the predetermined car seat condition and generating the first signal when the child car seat is retained in the predetermined location.

23. The child care device of claim 16, wherein the inflation means further includes seat-lock sensor means for determining that the child car seat is retained in a stationary locked position on the vehicle passenger seat to establish the predetermined car seat condition and generating the first signal when the child car seat is retained in the stationary locked position.

24. The child care device of claim 16, wherein the child-restraint harness further includes a chest clip comprising a first part coupled to the first shoulder strap and a second part coupled to the second shoulder strap and configured to mate with the first part to maintain relative position of the first shoulder strap relative to the second shoulder strap when the child-restraint harness is worn by a child seated on the child car seat and the inflation means further includes strap-locking means for determining that the first part of the chest clip is mated to the second part of the chest clip to establish the predetermined car seat condition and generating the first signal when the first and second parts are mated.

25. The child care device of claim 16, wherein the inflation means further includes child-presence sensor means for sensing an external weight force applied to a seat portion of the child car seat to determine that a child is seated on the child car seat to establish the predetermined car seat condition and generating the first signal when the external weight force exceeds a predetermined level.

\* \* \* \* \*